United States Patent Office 3,068,288
Patented Dec. 11, 1962.

3,068,288
PROCESS FOR PRODUCING SALTS OF
1-PHENYLCYCLOHEXYL AMINE
Erik F. Godefroi, Detroit, Mich., assignor to Parke, Davis & Company, Detroit, Mich., a corporation of Michigan
No Drawing. Filed Apr. 4, 1960, Ser. No. 19,478
1 Claim. (Cl. 260—570.5)

This application is a continuation-in-part of application Serial No. 684,864, filed September 19, 1957, now abandoned and application Serial No. 710,390, filed January 22, 1958, now abandoned and the invention relates to a process for producing 1-phenylcyclohexylamine and its acid addition salts.

In accordance with the invention mineral acid salts of 1-phenylcyclohexylamine are produced by hydrolyzing 1-phenylcyclohexyl isocyanate or 1-phenylcyclohexyl isothiocyanate with an aqueous mineral acid such as hydrochloric acid, sulfuric acid, phosphoric acid, hydrobromic acid and the like. The 1-phenylcyclohexylamine acid addition salt can be isolated from the reaction mixture in this form or it can be treated with an alkaline reagent such as ammonium hydroxide, an alkali metal hydroxide, an alkali metal carbonate, an alkaline earth metal hydroxide, an alkaline earth metal carbonate and the like to produce the free base of 1-phenylcyclohexylamine which can be isolated or reacted with another acid to produce another acid addition salt which is isolated. The acid addition salts can also be prepared from the isolated free base. Some examples of the many acid addition salts which can be prepared from the free base are the mineral acid salts such as the hydrochloride, hydrobromide, sulfate and phosphate; organic acid salts such as the succinate, benzoate, acetate, p-toluenesulfonate and benzenesulfonate and salts with other strong acids such as the sulfamate.

The reaction is most conveniently carried out by heating the reaction mixture at the boiling point. If desired, a water-miscible organic solvent such as acetic acid, ethanol, methanol, isopropanol and the like can be added to increase the solubility of the 1-phenylcyclohexyl isocyanate or 1-phenylcyclohexyl isothiocyanate thereby increasing the rate of the hydrolysis reaction. The quantity of the mineral acid is not particularly critical but in practice an excess several times greater than the theoretically required one equivalent is employed.

In carrying out the process one can either employ the 1-phenylcyclohexyl isocyanate or isothiocyanate per se or produce either of these starting materials in situ. For example, one can react 1-phenylcyclohexane carboxamide with an alkali metal hypohalite to produce a crude 1-phenylcyclohexyl isocyanate which can be used as the starting material. One can also react 1-phenylcyclohexane carboxylic acid with hydrazoic acid and a mineral acid to produce the desired isocyanate in situ which is transformed into an acid addition salt of 1-phenylcyclohexylamine without isolation. Similarly, treatment of 1-phenylcyclohexane carboxylic acid azide with a mineral acid results in the production of 1-phenylcyclohexyl isocyanate in situ which is converted to the desired amine acid addition salt without isolation.

The 1-phenylcyclohexylamine and its non-toxic acid addition salts produced by the process of the invention are useful in both veterinary and human medicine as anesthetic agents. They may be administered by the oral or parenteral routes. The term "non-toxic acid addition salts" as used herein means an acid addition salt which is not substantially more toxic than an equal weight of the free base of 1-phenylcyclohexylamine.

The invention is illustrated by the following examples.

Example 1

Thirty ml. of concentrated sulfuric acid is added to a mixture composed of 15.8 g. of 1-phenylcyclohexene, 50 ml. of butyl ether, and 12.2 g. of sodium cyanate at 40° C. and the reaction mixture stirred for about one hour. The reaction mixture is poured into water, extracted with ether, and the ether layer removed. The ether is evaporated from the solution on a steam bath and the butyl ether removed by distillation under reduced pressure. The residual 1-phenylcyclohexyl isocyanate is refluxed with 30 ml. of concenrted hydrochloric acid for three hours, the solution containing the 1-phenylcyclohexylamine hydrochloride made basic and extracted with ether. The ether extracts are dried and then treated with an excess of isopropanolic hydrogen chloride. The hydrochloride salt of 1-phenylcyclohexylamine which precipitates is collected and purified by recrystallization from isopropanol-ether mixture; M.P. 247–8° C.

If desired, the 1-phenylcyclohexylamine can be precipitated as the hydrobromide, sulfate or p-toluenesulfonate salt by substituting the respective acid for the hydrogen chloride used in the above procedure.

Example 2

A solution of 25 g. of concentrated sulfuric acid and 6 ml. of water is added dropwise to a slurry of 54 g. of 1-phenylcyclohexene and 29 g. of sodium thiocyanate at 30° C. The addition is carried out over a period of one hour and then the reaction mixture maintained at 40–45° C. for an additional five hours. After standing for 16 hours at room temperature the reaction mixture is diluted with water and extracted with ether. The ether solution is washed with water, aqueous sodium bicarbonate, and with water again. After drying over magnesium hydroxide, the ether is distilled and the residue distilled in vacuo to obtain the desired 1-phenylcyclohexyl isothiocyanate; B.P. 127–130° C. at 0.15 mm.

A mixture consisting of 21 g. of 1-phenylcyclohexyl isothiocyanate, 10 ml. of glacial acetic acid and 75 ml. of concentrated hydrochloric acid is refluxed until the oily layer disappears. The solution is cooled, made alkaline with sodium hydroxide solution and extracted with ether. The ether extract is washed with water, dried, and the ether evaporated. The residue which consists of 1-phenylcyclohexylamine is converted to the hydrochloride salt by treatment with isopropanolic hydrogen chloride. The salt is precipitated by dilution with ether and purified by recrystallization from the isopropanol-ether mixture; M.P. 247–8° C.

Example 3

Fifty-one grams of 1-phenylcyclohexane carboxylic acid in 500 ml. of benzene is added to 150 ml. of concentrated sulfuric acid and the resulting mixture is stirred vigorously at 40° C. A solution of 12 grams of hydrazoic acid in 250 ml. of benzene is added slowly, and when the reaction subsides the mixture is poured onto crushed ice and shaken vigorously. The benzene layer is removed and the aqueous layer washed with ether. The aqueous layer is made strongly basic by the addition of excess aqueous sodium hydroxide solution and the liberated amine extracted with ether. The ether extract is washed with water, dried over potassium carbonate, and the ether distilled from the dried solution. The residue is distilled under reduced pressure to obtain the desired 1-phenylcyclohexylamine in pure form; B.P. about 84–9° C. at one millimeter.

The hydrochloride salt of 1-phenylcyclohexylamine is prepared by dissolving the free base in ether and treating the solution with an excess of isopropanolic hydrogen chloride. The precipitated hydrochloride salt is collected and purified by recrystallization from a mixture of isopropanol and ether; M.P. 247–8° C. The hydrobromide salt of 1-phenylcyclohexylamine can be prepared in the same manner by using an alcoholic solution of hydrogen bromide instead of the isopropanolic hydrogen chloride.

The acetate salt of 1-phenylcyclohexylamine can be prepared by treating the free base with glacial acetic acid and precipitating the salt by the addition of ether. The salt is purified by recrystallization from isopropanol-ether mixture; M.P. 144–5° C.

*Example 4*

Four hundred ml. of thionyl chloride is added cautiously to 194 g. of 1-phenylcyclohexane carboxylic acid. After the initial reaction has subsided, the solution is refluxed for one hour and then the excess thionyl chloride removed in vacuo. The crude acid chloride is added to 2000 ml. of concentrated ammonium hydroxide at 20–30° C. and the mixture stirred for one hour. The 1-phenylcyclohexane carboxamide is collected and purified by recrystallization from iso-octane; M.P. about 90° C.

One hundred and fifty-five g. of 1-phenylcyclohexane carboxamide is added to a solution of sodium hypobromite (prepared by the addition of 39 ml. of bromine to a solution of 475 g. of potassium hydroxide in 2.2 l. of water at 25° C.) keeping the temperature at about 15° C. The reaction mixture is stirred for one or two hours at 15–30° C. and then extracted with 350 ml. portions of ether. The ether solution containing the 1-phenylcyclohexyl isocyanate is then added slowly to 650 ml. of refluxing hydrochloric acid in an apparatus equipped for simultaneous distillation of the ether. After the reaction mixture ceases to foam it is refluxed for an additional hour and then transferred to another flask. Upon cooling, the hydrochloric acid salt of 1-phenylcyclohexylamine crystallizes. The product is collected, washed with ether and then purified by recrystallization from methanol-ether mixture; M.P. 247–8° C.

The sulfate salt of 1-phenylcyclohexylamine can be prepared by adding the free base to an alcohol solution containing one equivalent of sulfuric acid. The salt is precipitated by the addition of ether and purified by recrystallization from methanol-ether mixture.

I claim:

Process for the production of a mineral acid salt of 1-phenylcyclohexylamine which comprises reacting a compound of the class consisting of 1-phenylcyclohexyl isocyanate and 1-phenylcyclohexyl isothiocyanate with at least one equivalent of an aqueous mineral acid.

References Cited in the file of this patent

Kursonov: "Chemical Abstracts," vol. I, pages 2092–2093 (1907).

Arnold et al.: "Chemical Reviews," vol. 57, pages 51, 52 (1957). (Available in Patent Office Scientific Library.)